(12) United States Patent
Young et al.

(10) Patent No.: US 6,239,918 B1
(45) Date of Patent: May 29, 2001

(54) TELESCOPIC OPTICS WITH PERIPHERAL VISION

(75) Inventors: Mark Young, P.O. Box 994, SLC, UT (US) 84110-0994; Julie Brinson, Greensburg, IN (US); Jeb Zaun, Roseville, MN (US)

(73) Assignee: Mark Young, Houston, TX (US)

( * ) Notice: Subject to any disclaimer, the term of this patent is extended or adjusted under 35 U.S.C. 154(b) by 0 days.

(21) Appl. No.: 09/346,087

(22) Filed: Jul. 1, 1999

Related U.S. Application Data

(60) Provisional application No. 60/093,504, filed on Jul. 18, 1998.

(51) Int. Cl.[7] ............................ G02B 13/22; G02B 23/00; G02B 21/00; G02B 21/20; G02B 21/22

(52) U.S. Cl. .......................... 359/663; 359/420; 359/382; 359/375; 359/376; 359/399

(58) Field of Search ................................... 359/663, 420, 359/382, 375, 376, 399

(56) References Cited

U.S. PATENT DOCUMENTS

| | | | |
|---|---|---|---|
| 3,572,886 | * | 3/1971 | Curtiss .................................. 350/20 |
| 4,867,545 | * | 9/1989 | Wakimoto ............................ 350/415 |

\* cited by examiner

*Primary Examiner*—Georgia Epps
*Assistant Examiner*—Michael A. Lucas

(57) ABSTRACT

An optical device and a viewing method having a higher magnification viewing area located substantially centrally in a lower magnification area, whereby the structure facilitates locating viewing object within in higher magnification viewing area.

2 Claims, 5 Drawing Sheets

TELESCOPIC OPTICS WITH PERIPHERAL VISION

BACKGROUND—CROSS-REFERENCES TO PROVISIONAL APPLICATION AND RELATED DISCLOSURE DOCUMENT

This application claims the benefit of U.S. Provisional Application No. 60/093,504 filed Jul. 18, 1998.

This application also references Document Disclosure Statement 435,168 filed Mar. 12, 1998.

FIELD OF THE INVENTION

This invention relates to optics, in particular optics used to view objects in magnification.

BACKGROUND OF THE ART

The closest known prior art are bifocal eyeglasses and rear view mirrors with magnification viewing area. Other prior art include telescopes, binoculars, and microscopes.

The problem with the prior art is that it is difficult to locate the object being viewed in the high magnification viewing area. It is often a multiple set process to view the object within the high magnification viewing area. For instance, with a microscope, a researcher will locate an organism to be viewed in the lowest magnification area, centering the organism within the viewing area. Secondly, the researcher will select the next higher magnification and center the organism being viewed in the viewing area. Third, the researcher will switch to the next higher magnification, centering the organism within the viewing area. The process is repeated until the organism is viewable within the highest magnification viewing area. However, tracking the movement of a living organism can be difficult if the organism is moving. If the organism moves outside of the high magnification viewing area, it can be difficult to locate it again. The process of locating the organism in a lower magnification may be necessary if the organism moves outside the high magnification viewing area.

Hunters have difficulty using high magnification rifle scopes if their target is moving. Once the target moves outside of the viewing area, it can be very difficult to locate the target again using the high magnification viewing area.

In general, high magnification systems have a problem that once the object leaves the high magnification field of view, it is difficult to determine the new location.

SUMMARY OF THE INVENTION

This invention improves the problems with the prior art of locating objects within the high magnification viewing area. The prior art problem can be solved by an imagery system with a high magnification in the center and a lower magnification in the periphery.

One embodiment of applicant's optic device is a lens with multiple refractive indexes that can replace conventional lens on a telescope or binoculars, or microscope to be make locating the object in the high magnification viewing area.

Another embodiment of applicant's optic device is an optical configuration of a plurality of lens and/or optical devices configured to give more than one magnification in the same viewing area located within the other, whereby making locating the object to be viewed in the high magnification area substantially easier.

Current lens design software, such as CodeV and ASAP, allow one skilled in the art to create additional embodiments without undue experimentation and achieve the optical output. These embodiments are incorporated herein by reference. However, the embodiments of applicants' optical device can be adjusted by one skilled in the art.

The teachings of Provisional Application: 60/093,504 and Document Disclosure Statement: 435,168 herein incorporated by reference.

Accordingly, several objects and advantages of applicant's optics device are:

1. It can be used to track moving objects in a high magnification area by tracking the object in the low magnification area until the object can be tracked into the high magnification area.

2. It can be used to by hunters shooting at animals. In conventional scopes, once the animal is outside of the high magnification viewing area and running, the hunter will have great difficulty trying to get the animal back into the high magnification viewing area. However, with a dual magnification viewing area, the animal could run out of the high magnification viewing area, but still be in a location allowing the hunter to relatively easily locate the animal back into the high magnification area to shoot the animal.

3. It can be used by biologists tracking the movement of a microorganism in a medium, so that when the object leaves the high magnification area, the microorganism can be easily tracked in the lower magnification area until the microorganism can be located within the high magnification area.

4. It can be used to reduce focusing time by astronomers who gaze at the heavens. Often high magnification telescopes will have multiple varying magnification telescopes mounted on the high magnification telescope. The lowest magnification telescope will be centered on the heavenly body. This action places the heavenly body in the next higher magnification telescopes view. Then the heavenly body is centered again. This process is repeated until the heavenly body is visible through the highest magnification telescope.

5. It could be used at sporting events to allow camera people to more easily zoom in on action parts of sports and track the "action" while remaining in the high magnification through use of applicant's optical device.

6. It could have more than two areas of magnification to minimize aberations and blindspots. For instance, it could have three or four areas of magnification to facilitation use.

7. Further objects and advantages of my invention will become apparent from a consideration of the drawings and ensuing description.

DETAILED DESCRIPTION

Figure 1:
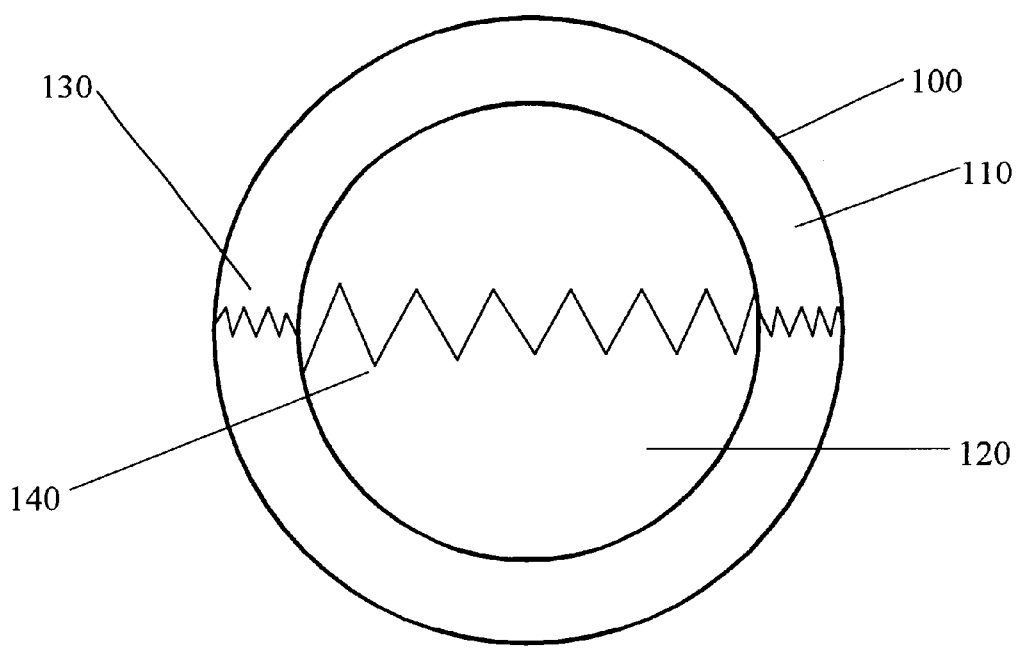
FIG. 1 shows a view through optic demonstrating the different magnifications.

Description—FIG. 1 View Through Optic

FIG. 1 comprises optic device 100. Within optic device 100 is located lower magnification viewing area 110. Within lower magnification viewing area 110 is located higher magnification viewing area 120.

Operation—FIG. 1 View Through Optic

Optic device 100 has a viewing area lower magnification viewing area 110. Within lower magnification viewing area 110 is located higher magnification viewing area 120, which is preferable substantially centrally located on optic device 100. Object can be viewed in lower magnification viewing area 10 and higher magnification viewing area 120. Object appears in a lower magnification in object being viewed in low magnification 130. Object appears in greater magnification in object being viewed in high magnification 140.

Figure 2:
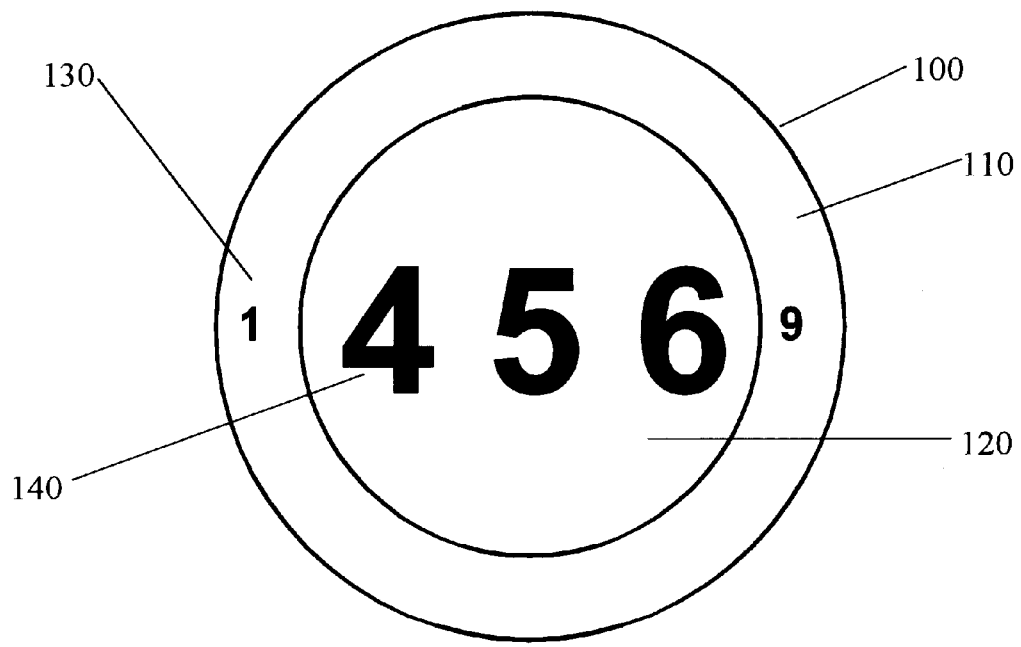
FIG. 2 shows a view through optic of a number sequence (123456789) demonstrating the different magnifications.

Description—FIG. 2

FIG. 2 comprises optic device 100. Within optic device 100 is located lower magnification viewing area 110. Within lower magnification viewing area 110 is located higher magnification viewing area 120.

Operation—FIG. 2

Optic device 100 has a viewing area lower magnification viewing area 110. Within lower magnification viewing area 110 is located higher magnification viewing area 120, which is preferable substantially centrally located on optic device 100. Object can be viewed in lower magnification viewing area 10 and higher magnification viewing area 120. Object appears as object being viewed in low magnification 130 in a lower magnification viewing area 110. Object appears in greater magnification as object being viewed in high magnification 140 in a higher magnification viewing area 120. In this example, the viewed object is a number sequence, "1 2 3 4 5 6 7 8 9." If the viewer wished to locate a particular number of the sequence in higher magnification viewing area 120, the viewer would first see it in the lower magnification viewing area 110, making it easier to locate the particular number in higher magnification viewing area 120. Thus, optic device 100 makes locating viewed object in high magnification easier.

Figure 3:
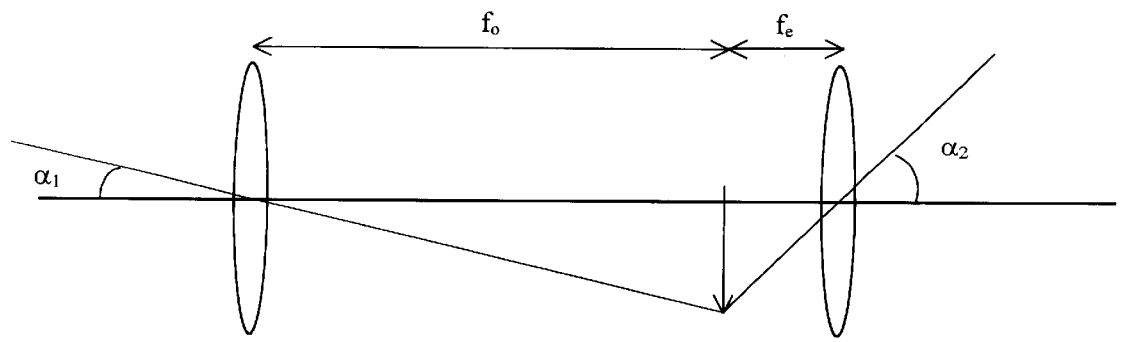
FIG. 3 shows angles and distances for astronomical telescope

FIG. 3 Astronomical Telescope

A basic telescope is an inverting telescope, also referred to as a Keplerian telescope. It consists of a positive objective lens and a positive eyepiece lens, separated by the sum of their focal lengths. Such a system is called telecentric because their focal points coincide allowing waves of light arriving from infinity to leave the system heading towards infinity. The angular magnification of a simple telescope is given by the negative ration of the objective focal length and the eyepiece focal length, represented by Mang below in the equation:

$$M_{ang} = -\frac{f_o}{f_e} = \frac{\alpha_2}{\alpha_1}$$

This equation also says that the angular magnification can be calculated from the ratio of the angles of light leaving the system and entering the system, respectively (note that angle sign convention must be observed).

Figure 4:
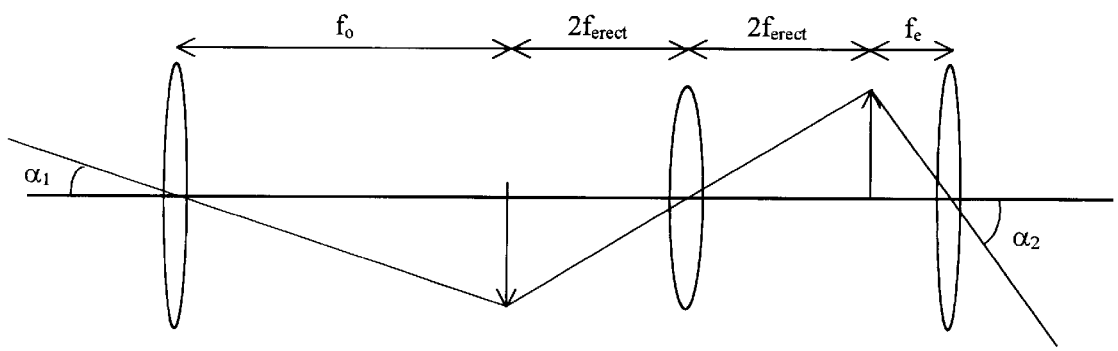
FIG. 4 shows angles and distances for terrestrial telescope

FIG. 4 Terrestrial Telescope

In many applications, it is preferred that the magnification system produce a non-inverted image. Thus, the Keperian telescope should be modified if used to allow a non-inverted image in most applications.

$$M_{ang} = \frac{f_o}{f_{erector}} \times -\frac{f_{erector}}{f_e} = \frac{f_o}{f_e}$$

A terrestrial telescope comprising of three lenses (objective, eyepiece, and erector), can work for the peripheral system. Incorporating the center system is a little more complex. Designing the center system involved using small optics that would be incorporated into the traditional system to produce the dual magnification. After using paraxial optics to predict the rays, the lens configuration in FIG. 5 was designed. In this system, the peripheral view is the result of the first two lenses. The magnification of the periphery is given by the ratio of their respective focal lengths. This set of a telescope and the rays exiting the second lense are focused at infinity (or in parallel). The third and fourth lenses take the central parallel rays and act as a second telescope. The rays also exit the fourth lens in parallel. After the fourth lense, the diameter of the exiting beam is too great for the eye to see entirely. To accommodate the eye, an eye piece is needed. The parallel rays after the fourth lense are then brought to a focus by another lense, which then be viewed by an eyepiece.

Then computer optic analysis software, such as Oslo or similar program, can be used to minimize aberrations. The lens data (focal length, diameter, thickness, curvature, and refractive index) can be determined by selecting readily available lenses to reduce costs if desired. Achromats and doublets were selected for better image quality. The lens orientation and separation were varied until the aberrations in the system were substantially reduced. For example, spherical aberrations were reduced when the distance between the fourth and fifth lenses was minimized. Also, chromatic aberrations were minimized when the distance between the second and third lens was minimized.

Figure 5:
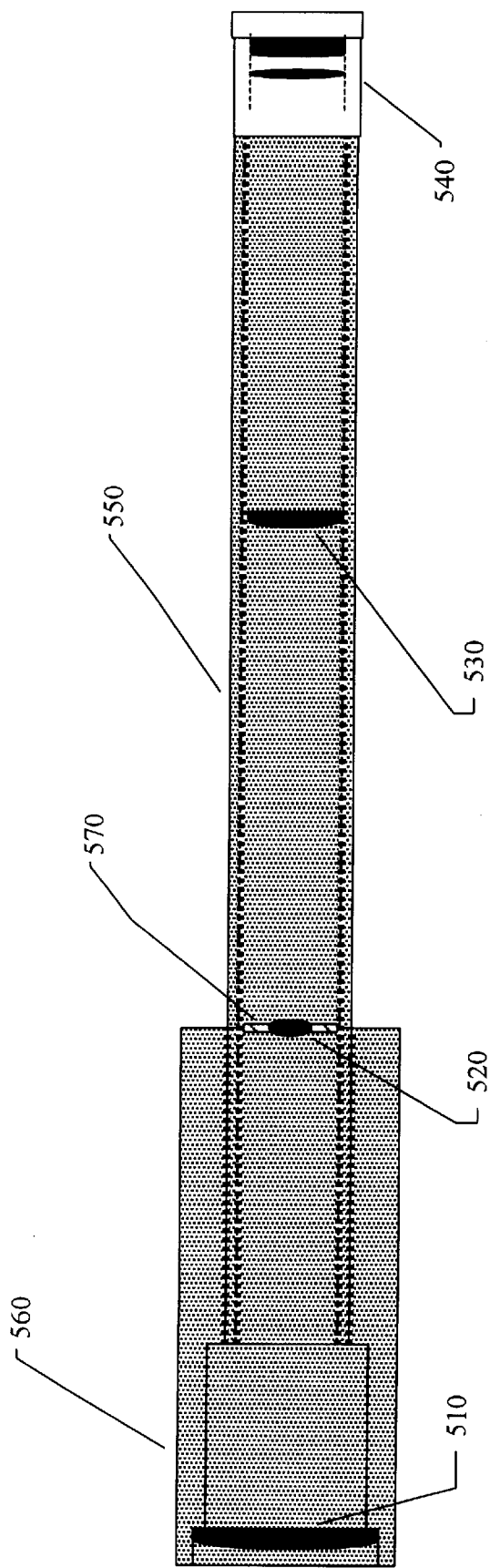
FIG. 5 shows prototype telescope design

FIG. 5 Prototype Design

A prototype can be built using an objective lens 510, biconvex lens 520, planoconvex 530, and an eyepiece 540. An aluminum common tube 550 was used to house all the lenses, except for the objective lens 510. A aluminum objective tube 560 for the objective lens 510 was built to accommodate the objective lens 510. The objective tube 560 is shorter in length and larger in diameter than the common tube 550. Objective tube 560 and common tube 550 screw together, with the inside of the objective tube 560 and the first few centimeters of the outside of the common tube 550 threaded to fit together. The objective lens 510 is permanently mounted in front of the objective tube 560. The inside of the common tube 550 is threaded throughout to mount the lenses. The biconvex lens 520 responsible for the center system is mounted in a piece of transparent material, in this case, Plexiglas as a transparent mount 570. The transparent mount 570 is then mounted into the common tube 550 by thin aluminum rings. The rings are threaded on the outside and screw into the common tube 550. Similar rings are also used to mount the planoconvex lens 530 to common tube 550. The benefit to mounting the lenses in this manner is the freedom of adjustment of each lens position. The threading inside common tube 550 allows position adjustment of each lens. The position of the lenses 520 and 530 can be adjusted until the system is properly aligned. The final part of the telescope, the eyepiece 540, also screws to the common tube 550.

The parts used were a planoconvex 50 mm diameter, 100 mm focal length as the objective lens 510 located 11.665 cm from a biconvex lens 520 (mounted on transparent mount 570) 9 mm diameter 45 mm, focal length lens. The biconvex lens 520 is located 11.545 cm away from a planoconvex lens 530, 25 mm diameter, 50 mm focal length. The planoconvex lens 530 is located 8.335 cm from eyepiece 540 which was a kellner eyepiece 23 diameter, 27.5 mm focal length. This disclosure is intended to provide enablement for one skilled in the art to make the invention, applicants do not wish to be limited by this disclosure because numerous equivalent variations can be created. The design can be varied by one skilled in the art to produce equivalents.

Better quality lenses will produce better image quality. Although single lenses work well, aberrations can be reduced with doublets and achromats. Mirrors to separate the center and peripheral systems, then bringing them back together in the end could reduce the blindspot between the center and peripheral systems. An objective lens with multiple refractive indexes, providing multiple focal lengths could be used in the systems to reduce the blind spot.

The imaging system can include lenses and/or an optical device. An optical device is a system which comprises a plurality of lenses, such as telescopes, binoculars, and microscopes. The lenses can be created from a variety of materials including silicon, silica compounds, glass, and other transparent and semi-transparent substances. Optic device and optical device are used interchangably in the specification.

Figure 6:
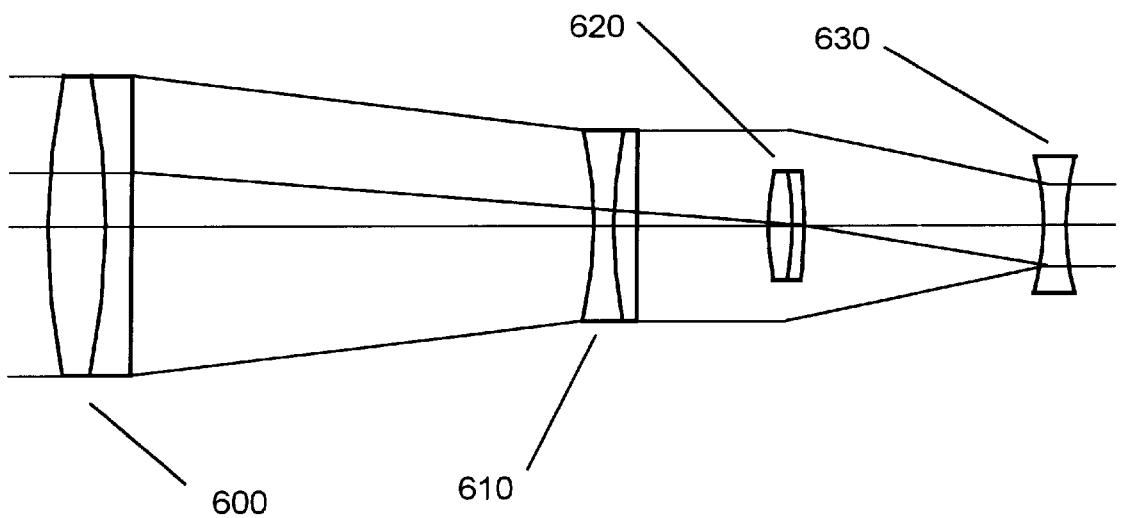
FIG. 6 shows an embodiment of a telecentric system

FIG. 6 Embodiment of Telecentric System

The previous design was applicable primarily when the object is at infinity. The design can be altered for closer distances. For example, distances like 50 meters. The new system should be an imaging system. The peripheral system can consist of the same lenses as the earlier system with a larger separation. For imaging, the small lenses need to be placed in a non-collimated beam. For simplicity of design, one of the small lenses was eliminated (though other designs are possible). The new system is shown in FIG. 6. FIG. 6 comprises a biconvex concavo-convex doublet 600, biconcave convex-plano doublet 610, biconvex concavo-plano doublet 620, and biconcave lens 630. The figure gives more detail of the embodiment. An advantage with this system is that the specification of the maximum target distance is met. The telescope can be focused on images from close to the object all the way up to 50 meters. Another advantage of this system is a minimization in the blind spot. The design can be varied by one skilled in the art to produce equivalents. For instance, the piano ends of the doublets could be varied to other shapes such as slightly concave or convex to produce substantial equivalents to the disclosure. Another possibility is the doublets could also be achromats which are lenses comprised of two different materials. There are numerous other possibilities to produce the substantial equivalent system with slight variations.

Figure 7:
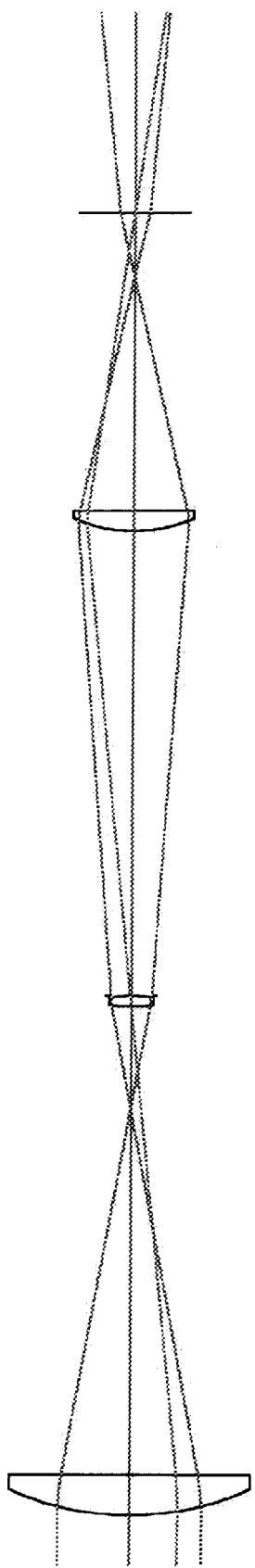
FIG. 7 shows paraxial ray traces through center magnified area of imaging system

FIG. 7 Paraxial Ray Traces Through Center Magnified Area Of Imaging System

Shows paraxial ray traces through center magnified area of imaging system. This shows the rays traced through the small lens that represent the center system.

Figure 8:
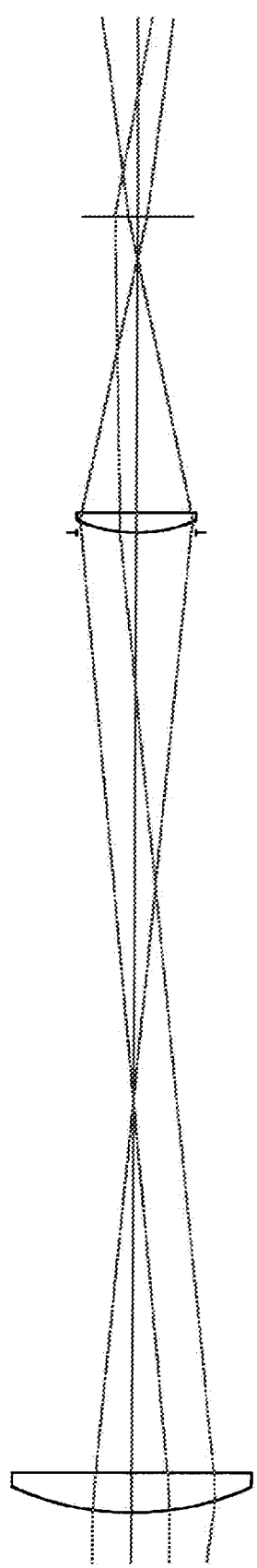
FIG. 8 shows paraxial traces through peripheral area of imaging system

FIG. 8 Paraxial Traces Through Peripheral Area Of Imaging System

Shows paraxial traces through peripheral area of imaging system. Shows the same system in FIG. 7; except with the small lens removed.

The imaging system may also include electronic components to enhance viewing. The imaging system may be used for a variety of applications, including but not limited to, telescopes, hunting scopes, binoculars, periscopes, microscopes, and other devices utilizing enhanced magnification. It could be used when tracking a moving object or target.

The optical device solves the problem of tracking a moving object in high magnification that may leave the area of high magnification, making finding the object difficult once out of the high magnification area. With the optical device, once the object has left the high magnification area, the object's location is known relative to the high magnification area. The process can be applied to optics with lenses or view electronic means with modem electronics, such as an electron microscope.

Further objects and advantages of applicants' invention will become apparent from a consideration of the drawings and ensuing description and can be adjusted by one skilled in the art.

What is claimed is:

1. An imagery system comprising:
   a. a high magnification viewing area substantially center of said imagery system,
   b. a lower magnification viewing area in periphery of said imagery system,
   c. a biconvex concavo-convex doublet,
   d. a biconcave convex-plano doublet,
   e. a biconvex concavo-plano doublet, and
   f. a biconcave lens.

2. The imagery system of claim 1, wherein said imagery system comprises at least one achromat.

* * * * *